United States Patent
Lowe

(10) Patent No.: US 12,524,510 B2
(45) Date of Patent: Jan. 13, 2026

(54) GENERATING A SCALED IMPERSONATION ATTACK PREDICTION

(71) Applicant: Capital One Services, LLC, McLean, VA (US)

(72) Inventor: Kevin M. Lowe, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 218 days.

(21) Appl. No.: 18/470,807

(22) Filed: Sep. 20, 2023

(65) Prior Publication Data

US 2025/0094552 A1    Mar. 20, 2025

(51) Int. Cl.
*G06F 21/00*    (2013.01)
*G06F 21/31*    (2013.01)
*G06F 21/40*    (2013.01)
*G06F 21/55*    (2013.01)

(52) U.S. Cl.
CPC ............ *G06F 21/316* (2013.01); *G06F 21/40* (2013.01); *G06F 21/554* (2013.01); *G06F 2221/034* (2013.01); *G06F 2221/2113* (2013.01)

(58) Field of Classification Search
CPC ...... G06F 21/316; G06F 21/40; G06F 21/554; G06F 2221/034; G06F 2221/2113
See application file for complete search history.

(56) References Cited

U.S. PATENT DOCUMENTS

| | | | |
|---|---|---|---|
| 11,120,450 B1* | 9/2021 | Buckingham | G06Q 20/40145 |
| 2014/0289867 A1* | 9/2014 | Bukai | G06F 21/44 726/28 |
| 2020/0097643 A1* | 3/2020 | Uzun | G06V 40/40 |
| 2022/0006899 A1* | 1/2022 | Phatak | G06N 7/01 |
| 2022/0141252 A1* | 5/2022 | Shi | H04L 63/102 726/22 |
| 2023/0306065 A1* | 9/2023 | Desh | G06F 16/951 |
| 2024/0112192 A1* | 4/2024 | Mor, Jr. | G06Q 20/12 |

* cited by examiner

*Primary Examiner* — Ghazal B Shehni
(74) *Attorney, Agent, or Firm* — Harrity & Harrity, LLP

(57) ABSTRACT

In some implementations, a system may receive interaction information associated with a plurality of interactions, wherein each interaction in the plurality of interactions is associated with a respective user in a plurality of users. The system may retrieve passive user authentication information associated with the plurality of users. The system may compute a plurality of risk metrics based on the interaction information and the passive user authentication information, each risk metric in the plurality of risk metrics being associated with a respective interaction from the plurality of interactions. The system may generate a scaled attack prediction based on the plurality of risk metrics, the scaled attack prediction indicating an occurrence of a scaled attack. The system may perform a security action based on the scaled attack prediction indicating the occurrence of the scaled attack.

20 Claims, 7 Drawing Sheets

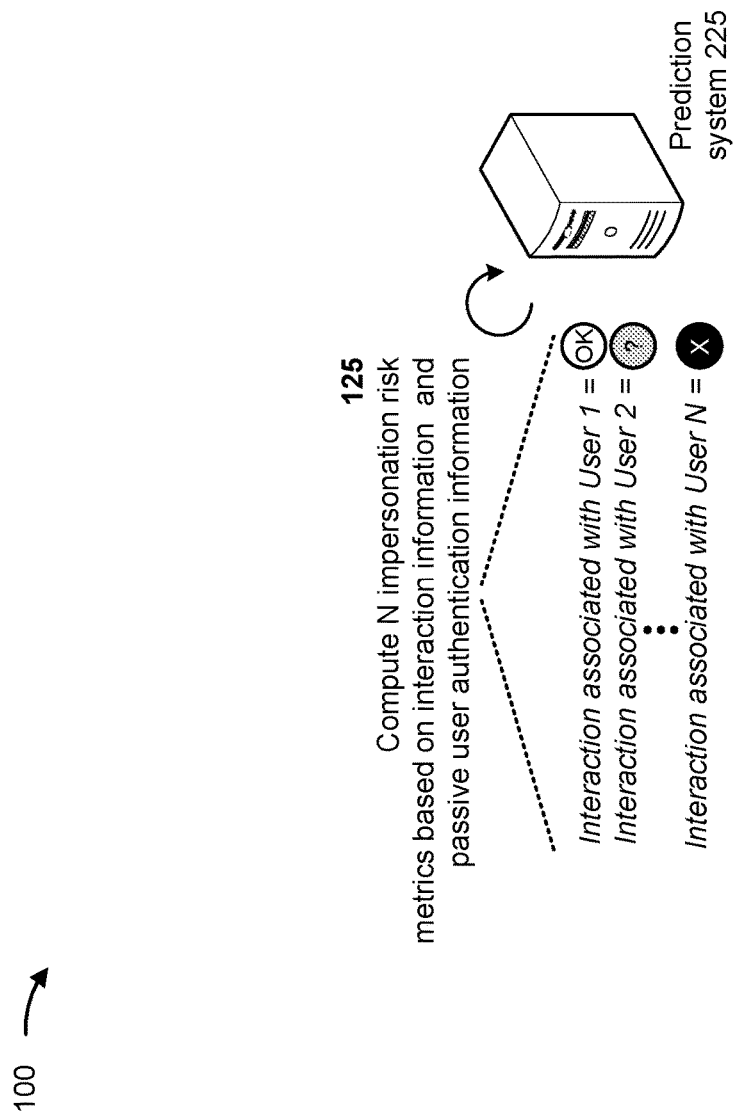

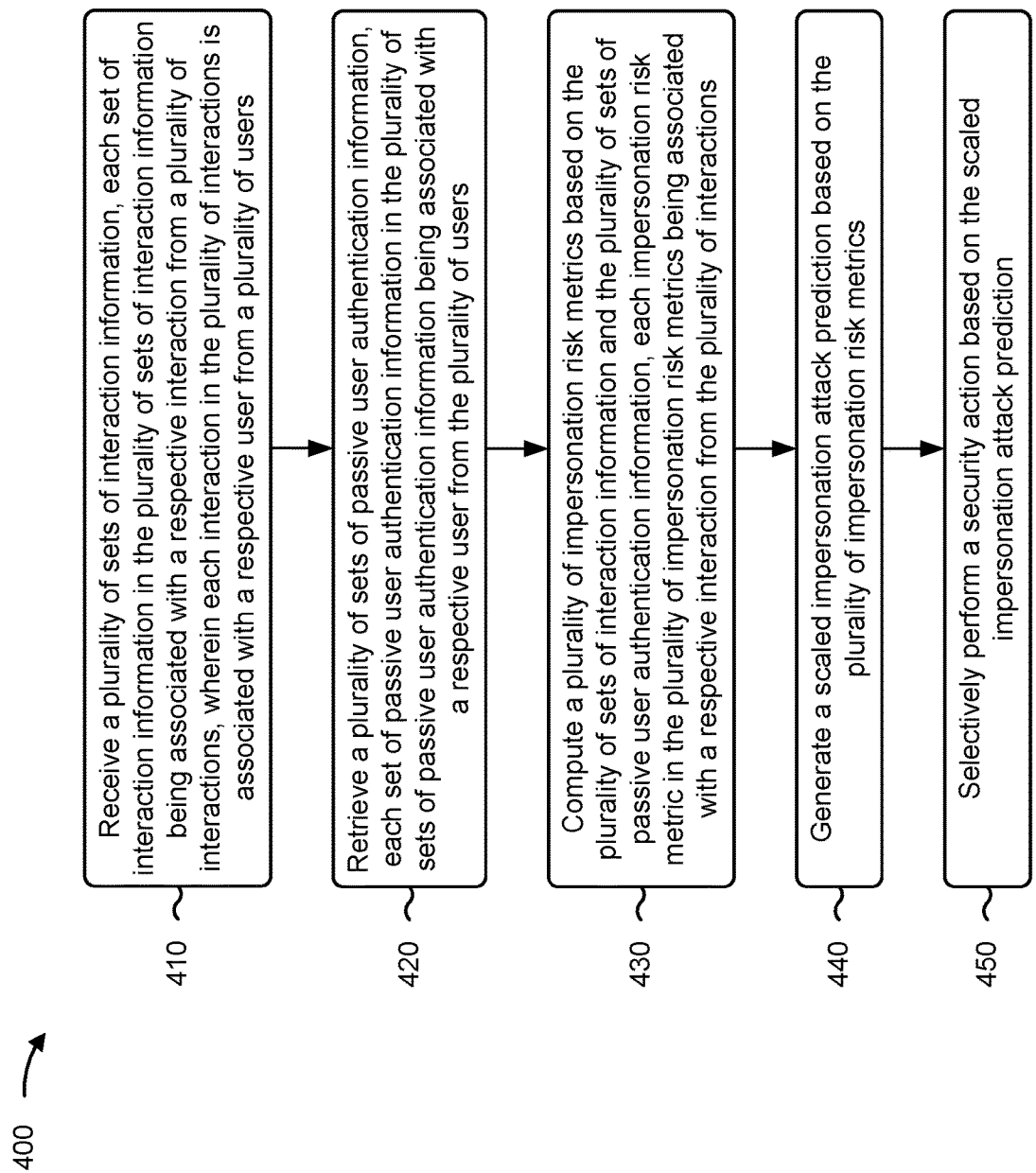

GENERATING A SCALED IMPERSONATION ATTACK PREDICTION

BACKGROUND

Multi-factor authentication is a layered approach to securing data and applications in which a system requires a user to present a combination of two or more items of authentication information in order to verify the identity of the user. Multi-factor authentication can be used to, for example, prevent a malicious actor from carrying out an impersonation attack by impersonating a legitimate user. Notably, multi-factor authentication increases security because, even if one item of authentication information associated with a user becomes compromised, a malicious actor or unauthorized user should not be able to meet one or more other authentication requirements and, therefore, will not be able to gain access to the target system.

SUMMARY

Some implementations described herein relate to a system for generating a scaled impersonation attack prediction. The system may include one or more memories and one or more processors communicatively coupled to the one or more memories. The one or more processors may be configured to receive a plurality of sets of interaction information, each set of interaction information in the plurality of sets of interaction information being associated with a respective interaction from a plurality of interactions, wherein each interaction in the plurality of interactions is associated with a respective user from a plurality of users. The one or more processors may be configured to retrieve a plurality of sets of passive user authentication information, each set of passive user authentication information in the plurality of sets of passive user authentication information being associated with a respective user in the plurality of users. The one or more processors may be configured to compute a plurality of impersonation risk metrics based on the plurality of sets of interaction information and the plurality of sets of passive user authentication information, each impersonation risk metric in the plurality of impersonation risk metrics being associated with a respective interaction from the plurality of interactions. The one or more processors may be configured to generate a scaled impersonation attack prediction based on the plurality of impersonation risk metrics. The one or more processors may be configured to selectively perform a security action based on the scaled impersonation attack prediction.

Some implementations described herein relate to a method for generating a scaled attack prediction. The method may include receiving, by a system, interaction information associated with a plurality of interactions, wherein each interaction in the plurality of interactions is associated with a respective user from a plurality of users. The method may include retrieving, by the system, passive user authentication information associated with the plurality of users. The method may include computing, by the system, a plurality of risk metrics based on the interaction information and the passive user authentication information, each risk metric in the plurality of risk metrics being associated with a respective interaction from the plurality of interactions. The method may include generating, by the system, a scaled attack prediction based on the plurality of risk metrics, the scaled attack prediction indicating an occurrence of a scaled attack. The method may include performing, by the system, a security action based on the scaled attack prediction indicating the occurrence of the scaled attack.

Some implementations described herein relate to a non-transitory computer-readable medium that stores a set of instructions. The set of instructions, when executed by one or more processors of a system, may cause the system to compute a plurality of risk metrics based on a plurality of sets of interaction information and a plurality of sets of passive user authentication information, wherein each set of interaction information in the plurality of sets of interaction information is associated with a respective interaction from a plurality of interactions, wherein each set of passive user authentication information in the plurality of sets of passive user authentication information is associated with a respective user from a plurality of users, wherein each interaction in the plurality of interactions is associated with a respective user from the plurality of users, and wherein each risk metric in the plurality of risk metrics is associated with a respective interaction from the plurality of interactions. The set of instructions, when executed by one or more processors of the system, may cause the system to generate a scaled attack prediction based on the plurality of risk metrics, the scaled attack prediction indicating a likelihood of an ongoing scaled attack. The set of instructions, when executed by one or more processors of the system, may cause the system to perform an action based on the scaled attack prediction.

BRIEF DESCRIPTION OF THE DRAWINGS

FIGS. 1A-1D are diagrams of an example associated with generating a scaled impersonation attack prediction, in accordance with some embodiments of the present disclosure.

FIG. 4 is a flowchart of an example process associated with generating a scaled impersonation attack prediction, in accordance with some embodiments of the present disclosure.

DETAILED DESCRIPTION

Figure 1A:
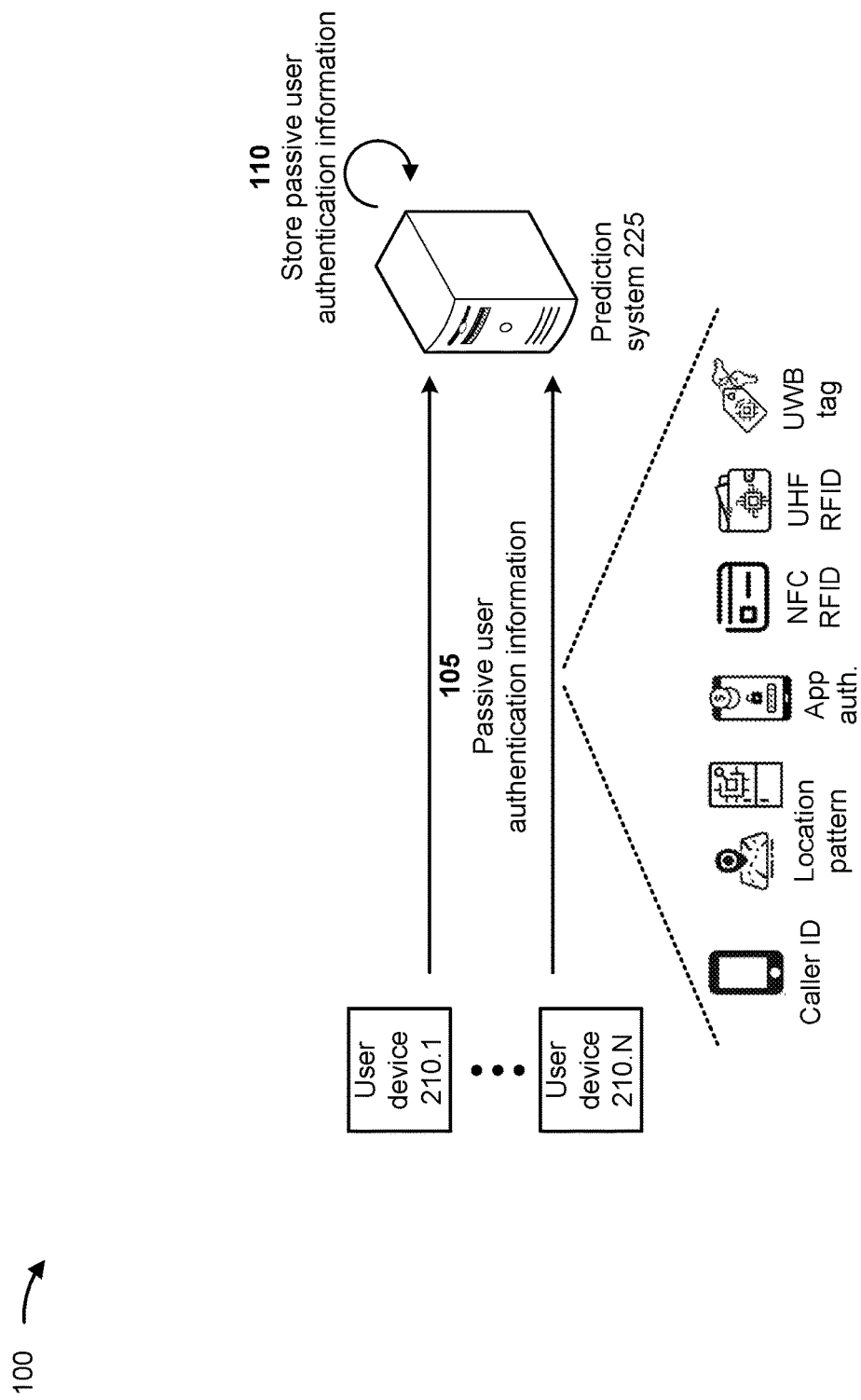

The following detailed description of example implementations refers to the accompanying drawings. The same reference numbers in different drawings may identify the same or similar elements.

An authentication model, such as a multi-factor authentication model, may be designed to utilize one or more items of biometric authentication information and/or one or more items of active user authentication information in association with authenticating a user associated with an interaction (e.g., a transaction, such as a transfer of funds). The one or more items of biometric authentication information may include, for example, facial recognition, fingerprint recognition, retina scanning, or voice recognition, among other examples. The one or more items of active user authentication information may include information that is actively provided (e.g., verbally, via a keypad) during an interaction, such as a password, a temporary passcode, or a personal identification number (PIN), among other examples.

However, biometric authentication information and active user authentication information may be vulnerable to theft by a malicious actor. Further, with increasing use of techniques such as generative artificial intelligence (AI), a malicious actor may be able to repurpose stolen biometric authentication information (e.g., in combination with stolen active user authentication information) to carry out an impersonation attack against a user (e.g., by impersonating the user and engaging in an unauthorized interaction to commit fraud). Such a tactic could be deployed on a large scale such that many (e.g., tens, hundreds, or thousands) of impersonation attacks using stolen information could be carried out concurrently. A scaled impersonation attack is a significant security risk that could result in many unauthorized interactions (e.g., tens, hundreds, or thousands of fraudulent transactions) being allowed to occur at the same time or within a short period of time.

Some implementations described herein enable generating a scaled impersonation attack prediction. In some implementations, a prediction system may receive sets of interaction information, each associated with a respective interaction, with each interaction being associated with a respective user. The prediction system may retrieve sets of passive user authentication information, each associated with a respective user. The prediction system may compute an impersonation risk metric associated with each interaction based on the sets of interaction information and the sets of passive user authentication information. The prediction system may then generate a scaled impersonation attack prediction based on the plurality of impersonation risk metrics, and may selectively perform a security action based on the scaled impersonation attack prediction.

In some implementations, the techniques described herein enable robust multi-factor authentication associated with a given interaction using passive user authentication information (i.e., information other than biometric authentication information and active user authentication information). Significantly, the passive user authentication information utilized in association with generating a scaled attack prediction as described herein is outside the reach of a malicious actor and, therefore, reduces a likelihood of an impersonation attack against a given user. Further, in addition to improving security on an individual level, the techniques described herein improve overall system security by enabling detection of a scaled impersonation attack (e.g., in real-time or near real-time) and preventing illegitimate interactions from proceeding, so as to reduce or minimize an impact of the scaled impersonation attack on the system. Additional details are provided below.

FIGS. 1A-1D are diagrams of an example 100 associated with generating a scaled impersonation attack prediction. As shown in FIGS. 1A-1D, example 100 includes a group of user devices 205 (e.g., user device 205.1 through user device 205.N (N>1)), a group of interaction devices 210 (e.g., interaction device 210.1 through interaction device 210.N), an interaction backend system 220, and a prediction system 225. These devices are described in more detail in connection with FIGS. 2 and 3.

As shown in FIG. 1A at reference 105, the prediction system 225 may receive a group of sets of passive user authentication information. Here, each set of passive user authentication information in the group of sets of passive user authentication information is associated with a respective user in a group of users. For example, as illustrated in example 100, the prediction system 225 may receive N sets of passive user authentication information, with each set of passive user authentication information being associated with a different user in a group of N users. As shown, the prediction system 225 may in some implementations receive a set of passive user authentication information associated with a given user from a user device 205 associated with the given user.

A set of passive user authentication information includes one or more items of passive data associated with a user. That is, the set of passive user authentication information includes one or more items of information that can be obtained passively by the prediction system 225 (e.g., such that the one or more items of data are received by the prediction system 225 without direct user action that causes the data to be provided). In some implementations, a given item of passive user authentication information may be obtained by and/or provided by a user device 205 associated with the user. That is, a user device 205 associated with the user may collect, sense, read, compute, determine, or otherwise obtain one or more items of passive user authentication information, and may provide the one or more items of passive user authentication information to the prediction system 225. Various examples of passive user authentication information are provided below.

In some implementations, the prediction system 225 may receive (e.g., from a user device 205) one or more items of passive user authentication information automatically (e.g., the user device 205 may provide one or more items of passive user authentication information without user intervention). Additionally, or alternatively, the prediction system 225 may receive one or more items of passive user authentication information on a periodic basis (e.g., when the user device 205 is configured to periodically provide one or more items of passive user authentication information). Additionally, or alternatively, the prediction system 225 may receive one or more items of passive user authentication information based on a request (e.g., the prediction system 225 may request one or more items of passive user authentication information from a user device 205).

In some implementations, the prediction system 225 may receive one or more items of passive user authentication information associated with a given user during an interaction associated with the user. For example, the user may be engaging in an interaction with interaction backend system 220 via a user device 205 associated with the user, and the prediction system 225 may receive (e.g., via the interaction backend system 220) one or more items of passive user authentication information during the interaction.

In some implementations, passive user authentication information associated with a given user may include caller identification data associated with the user. The caller identification data may include, for example, a name of a user, a telephone number of the user, or the like.

Additionally, or alternatively, the passive user authentication information associated with the given user may include application-based authentication data associated with the user. The application-based authentication data may include, for example, data associated with another (separate) authentication that is performed by an application (e.g., a banking application) running on a user device 205.

Additionally, or alternatively, the passive user authentication information associated with the given user may include near-field communication (NFC) radio frequency identification (RFID) chip data associated with the user. For example, the user device 205 may be in proximity to a transaction card, associated with the user, that includes an NFC chip. Here, the user device 205 may attempt to communicate with the NFC chip and, if successful, may obtain NFC RFID chip data from the transaction card. The NFC RFID chip data may include information associated with authenticating, authorizing, or processing a transaction using the transaction card, such as an account number, an expiration date, a security code, or the like. In some implementations, if the user device 205 is unable to communicate with the NFC chip, then the NFC RFID chip data may include an indication that the user device 205 was unable to obtain NFC RFID chip data.

Additionally, or alternatively, the passive user authentication information associated with the given user may include passive ultrahigh frequency (UHF) RFID data associated with the user. For example, the user device 205 may be in proximity to a UHF tag associated with the user (e.g., a tag associated with a UHF-enabled RFID wallet). Here, the user device 205 may attempt to read the UHF tag and, if successful, may obtain UHF RFID data from the tag. The UHF RFID data may include, for example, an identifier associated with the UHF tag. In some implementations, if the user device 205 is unable to read the UHF tag, then the UHF RFID data may include an indication that the user device 205 was unable to obtain UHF RFID data.

Additionally, or alternatively, the passive user authentication information associated with the given user may include ultra-wideband (UWB) tag data associated with the user. The UWB tag data may include information that identifies a location of a UWB tag associated with the user (e.g., a UWB tag affixed to a set of keys associated with the user). In some implementations, the UWB tag data enables tracking of the UWB tag (i.e., tracking of an object to which the UWB is affixed).

Additionally, or alternatively, the passive user authentication information associated with the given user may include location data associated with the user. As one example, the location data may include global navigation satellite system (GNSS)-based location data (e.g., information that indicates a set of global positioning system (GPS) coordinates of the user device 205). As another example, the location data may include interaction-based location data (e.g., information that identifies a location associated with a transaction, such as a merchant location). As another example, the location data may include Internet-of-things (IoT)-based location data (e.g., information that identifies a location of the user device 205 relative to an IoT enabled appliance, with the location being obtained via, for example, Bluetooth low energy (BLE) technology).

Additionally, or alternatively, the passive user authentication information associated with the given user may include interaction data associated with the user. The interaction data may include information associated with an interaction, such as information that identifies an entity (e.g., a merchant) associated with the interaction, information that identifies a time of the interaction, information that identifies a location of the interaction (e.g., a location of the merchant), information that identifies a monetary amount associated with the interaction (e.g., an amount of money transferred or paid), or information that identifies one or more items associated with the interaction (e.g., one or more items purchased), among other examples.

Additionally, or alternatively, the passive user authentication information associated with the given user may include background noise data associated with the user. For example, the user device 205 may be configured to collect background noise data during an interaction associated with the user, and provide the collected background noise data to the prediction system 225. As a particular example, the user device 205 may record background noise via a microphone of the user device 205 during a voice call associated with an interaction, and provide background noise data including the recorded background noise. In some implementations, the background noise data indicates a mode of operation associated with the user device 205. For example, if little or no background noise is present, then the background noise data may indicate that a voice isolation mode was enabled on the user device 205 during the interaction.

Notably, passive user authentication information associated with the given user does not include one or more items of information that are actively provided by the user during an interaction, such as biometric authentication information (e.g., facial recognition data, fingerprint data, retina scanning data, or voice recognition data, among other examples or the like), or one or more other items of active user authentication information (e.g., a password, a temporary passcode, a PIN, or the like).

In some implementations, a set of passive user authentication information associated with a given user may be used as a basis for authorizing an interaction associated with the user at a later time (e.g., during a future interaction). For example, the set of passive user authentication information may enable the prediction system 225 to determine a baseline that indicates one or more items of information that are expected to be present during a legitimate interaction associated with the user and/or expected values for one or more items of information expected during a legitimate interaction associated with the user. In some implementations, the prediction system 225 may compute a risk metric for a (later) interaction associated with the user based on comparing a set of passive user authentication information associated with the user to a set of interaction information associated with the interaction. That is, the prediction system 225 may in some implementations use the set of passive user authentication information associated with the user as a baseline for determining whether an interaction initiated at a later time is legitimate.

As shown at reference 110, the prediction system 225 may store the sets of passive user authentication information associated with the group of users. For example, the prediction system 225 may store each set of passive user authentication information in a memory that is accessible by the prediction system 225. In some implementations, the prediction system 225 may store the sets of passive user authentication information in a manner that enables the prediction system 225 to retrieve a given set of passive user authentication information at a later time. For example, in some implementations, the prediction system 225 stores an association between a given user and an associated set of passive user authentication information (e.g., such that the prediction system 225 can retrieve the set of passive user authentication information associated with the given user based on information that identifies the user).

Figure 1B:
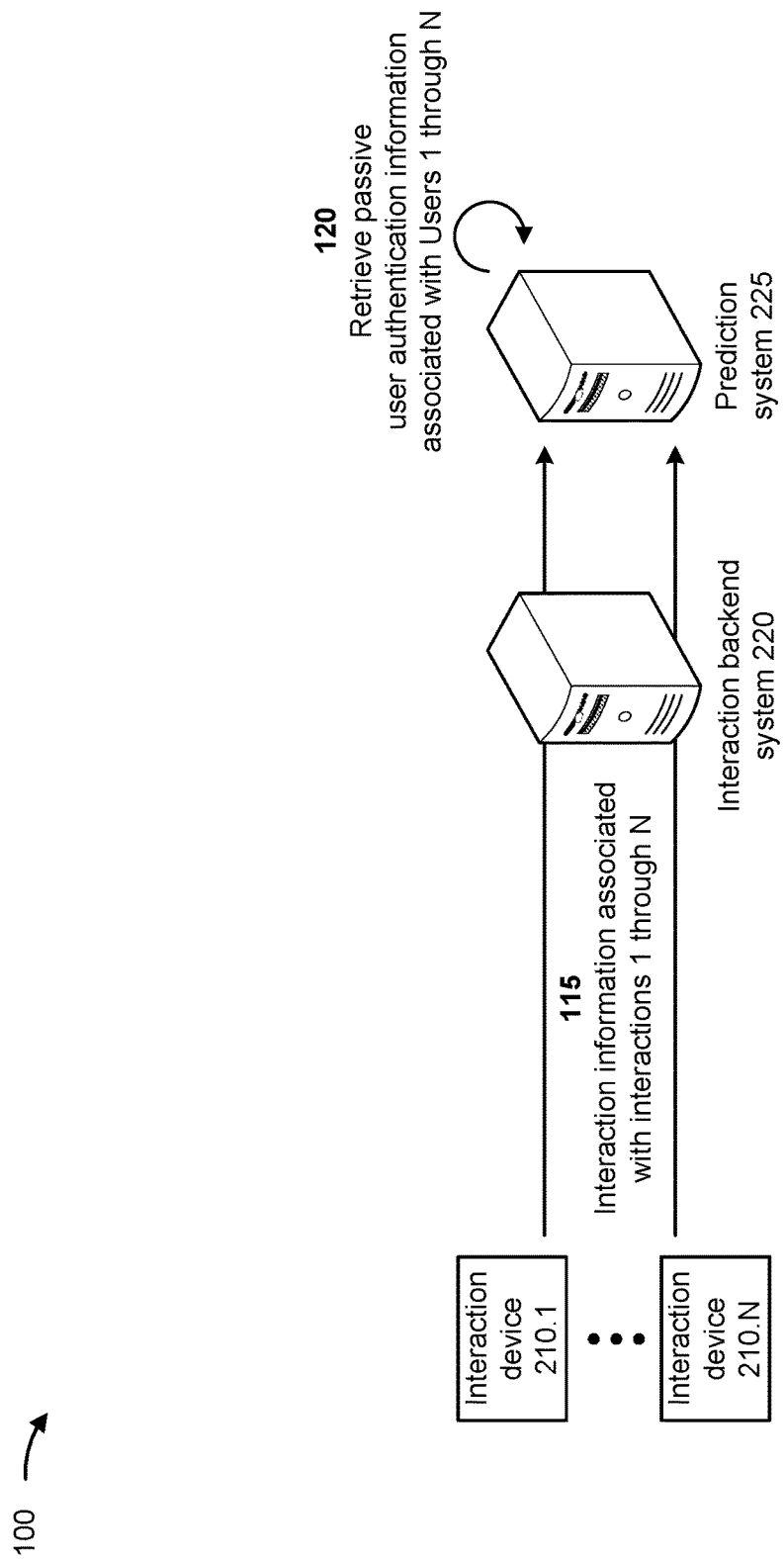

As shown in FIG. 1B at reference 115, the prediction system 225 may receive a plurality of sets of interaction information. Here, each set of interaction information in the plurality of sets of interaction information is associated with a respective interaction in a plurality of interactions. Further, each interaction in the plurality of interactions is associated with a respective user in a plurality of users. For example, the prediction system 225 may receive N sets of interaction information, with each set of interaction information being associated with a different ongoing interaction from a group of N ongoing interactions. Further, each of the N interactions is associated with a respective one of N users (e.g., the N users for which the prediction system 225 received sets of passive user authentication information). That is, each ongoing interaction is associated with (i.e., is purportedly being performed by) one of the N users for which the prediction system 225 has received and stored passive user authentication information. Notably, an interaction being performed by a malicious actor that is impersonating a user is still associated with the user (even though the user may not actually be performing the interaction). In some implementations, the prediction system 225 receives a given set of interaction information in real-time or near real-time during the interaction.

In some implementations, as shown, the prediction system 225 may receive interaction information associated with a given interaction during the interaction. For example, an entity (e.g., a malicious actor, a user) may be performing an interaction with interaction backend system 220 via an interaction device 210 associated with the entity, and the prediction system 225 may receive (e.g., via the interaction backend system 220) one or more items of interaction information during the interaction. In the case of a legitimate interaction (e.g., when the entity associated with the interaction is the user), the interaction device 210 may be a user device 205 associated with the user. Conversely, in the case of an illegitimate interaction (e.g., when the entity associated with the interaction is a malicious actor or an entity other than the user), the interaction device 210 may not be the user device 205 associated with the user.

In some implementations, a set of interaction information may include one or more items of information that are collected, sensed, determined, measured, or otherwise obtained during an ongoing (current) interaction. For example, in some implementations, the set of interaction information may include one or more items of passive user authentication information collected, sensed, measured, determined, or otherwise obtained during an ongoing (e.g., presently occurring) interaction. That is, in some implementations, a set of interaction information may include one or more items of information as described above with respect to reference 105.

Notably, in a scenario in which a user is performing a legitimate interaction with the interaction backend system 220, a set of interaction information received by the prediction system 225 may include information that matches or is similar to the set of passive user authentication information, associated with the user, that was previously received and stored by the prediction system 225. Conversely, in a scenario in which a malicious actor is performing an illegitimate or unauthorized interaction associated with the user (e.g., when the malicious actor is carrying out an impersonation attack), a set of interaction information received by the prediction system 225 may include information that does not match or is not similar to the set of passive user authentication information, associated with the user, that was previously stored by the prediction system 225. For example, in the case of an impersonation attack, one or more items of information that are included in the set of passive user authentication information associated with the user may be missing from the set of interaction information (e.g., NFC RFID chip data may be missing from the set of interaction information). As another example, in the case of an impersonation attack, values associated with one or more items of information that are included in the set of passive user authentication information may not match one or more corresponding values in the interaction information (e.g., a time of an interaction may be off-pattern from times of other interactions associated with the user).

As shown in FIG. 1B at reference 120, the prediction system 225 may retrieve the plurality of sets of passive user authentication information. As noted above, each set of passive user authentication information in the plurality of sets of passive user authentication information is associated with a respective user in the plurality of users. For example, the prediction system 225 may retrieve N sets of stored passive user authentication information, with each set of stored passive user authentication information being associated with a different user in the group of N users, as described above with respect to references 105 and 110.

In some implementations, the prediction system 225 may retrieve a set of passive user authentication information associated with a given user based on receiving a set of interaction information associated with the user. That is, the prediction system 225 may retrieve the set of passive user authentication information from storage after receiving a set of interaction information associated with the user.

As shown in FIG. 1C at reference 125, the prediction system 225 may compute a plurality of impersonation risk metrics based on the plurality of sets of interaction information and the plurality of sets of passive user authentication information. Here, each impersonation risk metric in the plurality of impersonation risk metrics is associated with a respective interaction from the plurality of interactions. For example, the prediction system 225 may compute N impersonation risk metrics, one for each of the N interactions associated with the N users. In some implementations, the prediction system 225 may compute an impersonation risk metric for each interaction based on a set of interaction information associated with an interaction associated with a user and passive user authentication information associated with the user.

In some implementations, the prediction system 225 may compute an impersonation risk metric based on comparing a set of passive user authentication information associated with a user and a set of interaction information for an interaction associated with the user. For example, the prediction system 225 may store a set of passive user authentication information for a user that includes: (1) caller identification data associated with a user, (2) GNSS-based location data associated with the user, (3) IoT-based location data associated with the user, (4) application-based authentication data associated with the user, (5) NFC RFID chip data associated with the user, (6) UHF RFID data associated with the user, and/or (7) UWB tag data associated with the user. In an example, the prediction system 225 may be configured to compute an impersonation risk metric that indicates a low impersonation risk for an interaction when a first individual risk threshold satisfied (e.g., when at least six of the seven items of information are present in the interaction information and match corresponding items of information in the set of passive user authentication information). Additionally, the prediction system 225 may be configured to compute an impersonation risk metric that indicates a medium impersonation risk for an interaction when a second individual risk threshold is satisfied (e.g., when at least three of the seven items of information are present in the interaction information and match corresponding items of information in the set of passive user authentication information) but the first individual risk threshold is not satisfied. Further, the prediction system 225 may be configured to compute an impersonation risk metric that indicates a high impersonation risk for an interaction when the second individual risk threshold is not satisfied (e.g., when two or fewer of the seven items of information are present in the interaction information and match corresponding items of information in the set of passive user authentication information).

In one example, the prediction system 225 may receive a set of interaction information for an interaction associated with a first user (e.g., user 1) that comprises items (1) through (7). Further, the prediction system 225 determines that each item of information in the interaction information is present in the interaction information and that each item of information matches a corresponding item of information in the set of passive user authentication information. For example, the prediction system 225 may determine that caller identification data is present in the interaction information and that the caller identification data in the interaction information matches the caller identification data in the set of passive user authentication information. As another example, the prediction system 225 may determine that GNSS-based location data is present in the interaction information and that the GNSS-based location data matches GNSS-based location data in the set of passive user authentication information (e.g., the prediction system 225 may determine that a geographical location indicated in the interaction information is on pattern with a geographical location as indicated by the set of passive user authentication information). In this example, the prediction system 225 makes similar determinations for the other five items of information. Thus, in this example, the prediction system 225 may compute the impersonation risk metric for the interaction as a low impersonation risk (e.g., "OK," as indicated in FIG. 1C), since at least six of the seven items of information in the set of passive user authentication information are present in the interaction information and matched in the interaction information.

In another example, the prediction system 225 may receive a set of interaction information for an interaction associated with a second user (e.g., user 2) that includes items (1) through (4) but does not include items (5) through (7). Here, the prediction system 225 determines that items of information (1) through (4) are present in the interaction information and that items of information (1) through (4) match corresponding items of information in the set of passive user authentication information. However, in this example, because items (5) through (7) are not present in the interaction information, the prediction system 225 may compute the impersonation risk metric for the interaction as a medium impersonation risk (e.g., "?," as indicated in FIG. 1C), since only four of the seven items of information in the set of passive user authentication information are present in the interaction information and matched in the interaction information.

In another example, the prediction system 225 may receive a set of interaction information for an interaction associated with an Nth user that includes items (1) through (3) but does not include items (4) through (7). Here, the prediction system 225 determines that caller identification data (e.g., item (1)) is present in the interaction information and that the caller identification data in the interaction information matches caller identification data included in the set of passive user authentication information. However, in this case, the prediction system 225 determines that GNSS-based location data included in the interaction information (e.g., item (2)), and IoT-based location data included in the interaction information (e.g., item (3)) do not match corresponding items of information in the set of passive user authentication information (e.g., the prediction system 225 may determine that a location indicated in the interaction information is off pattern from a location as indicated by the set of passive user authentication information). In this example, items (2) and (3) in the interaction information do not match corresponding items in the passive user authentication information and, further, items (4) through (7) are not present in the interaction information, and the prediction system 225 computes the impersonation risk metric for the interaction as a high impersonation risk (e.g., "X," as indicated in FIG. 1C), since only one of the seven items of information in the set of passive user authentication information is present in the interaction information and matched in the interaction information.

Notably, the above examples are provided for illustrative purposes, and other implementations may be used. In some implementations, the prediction system 225 may be configured to compute an impersonation risk metric in another manner. For example, the prediction system 225 may be configured with an individual impersonation risk model that receives a set of passive user authentication information associated with a user and a set of interaction information for an interaction associated with the user as input, and provides an impersonation risk metric as an output. In some implementations, the impersonation risk metric may indicate a level of risk (e.g., low, medium, high), a risk score (e.g., a value from 0 to 100), or another type of information indicative of an impersonation risk.

In some implementations, the prediction system 225 computes an impersonation risk metric for each interaction in the plurality of (ongoing) interactions. Thus, in some implementations, the prediction system 225 may compute a risk metric for each interaction of N interactions, with each interaction being associated with a respective one of N users.

Figure 1D:
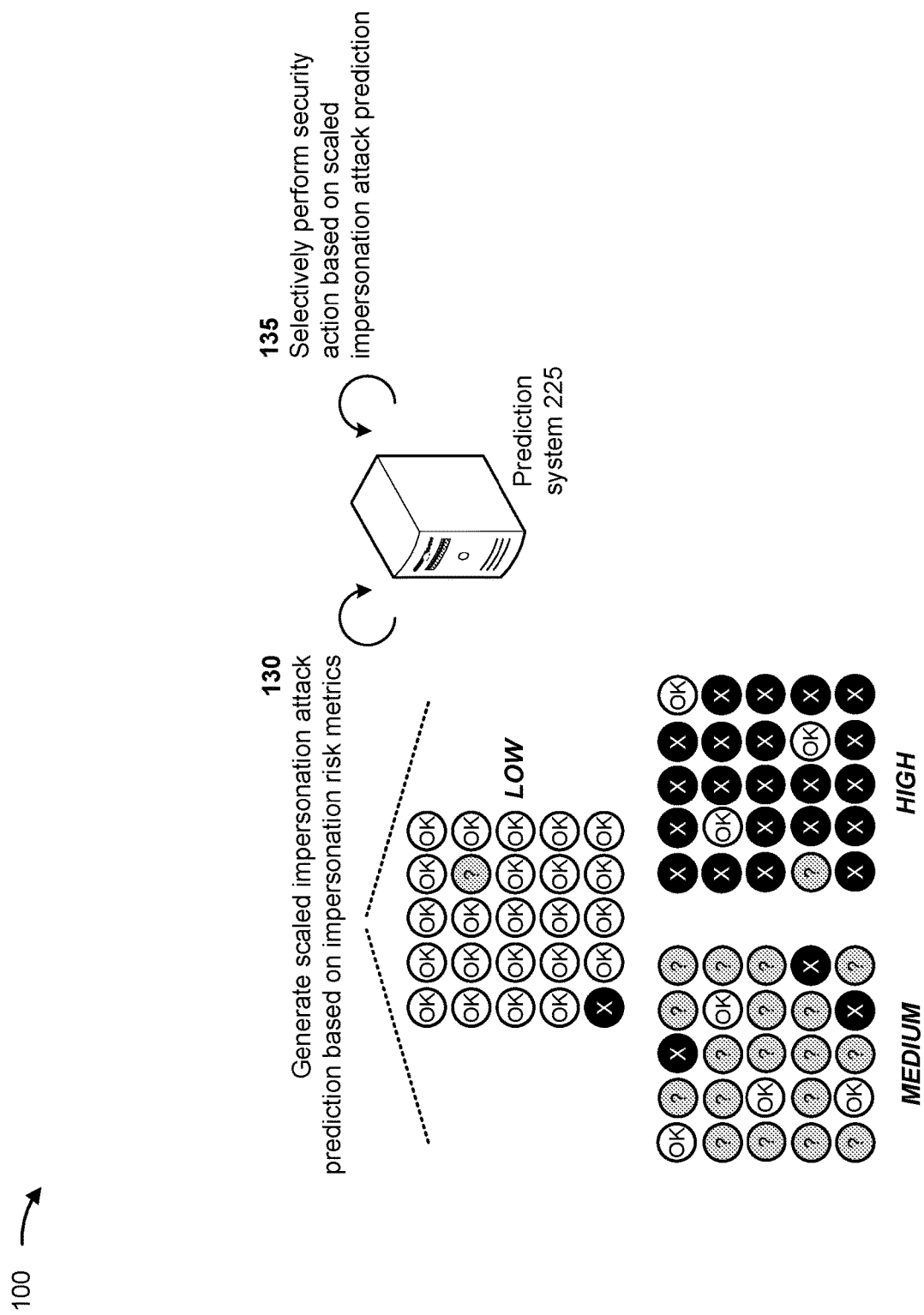

As shown in FIG. 1D at reference 130, the prediction system 225 may generate a scaled impersonation attack prediction based on the plurality of impersonation risk metrics. That is, the prediction system 225 may generate a scaled impersonation attack prediction based on the N impersonation risk metrics associated with the N interactions. A scaled impersonation attack prediction is a prediction indicating whether a scaled impersonation attack is occurring (e.g., against the processing system 215 or the interaction backend system 220).

In some implementations, the prediction system 225 may generate the scaled impersonation attack prediction based on whether a quantity of impersonation risk metrics satisfies a scaled impersonation attack threshold. The scaled impersonation attack threshold may be, for example, a quantity of impersonation risk metrics, or a percentage of impersonation risk metrics, among other examples. Thus, in some implementations, to generate the scaled impersonation attack prediction, the prediction system 225 may identify a quantity of impersonation risk metrics that satisfy one or more individual risk thresholds (e.g., a quantity of impersonation risk metrics that indicate low impersonation risk, a quantity of impersonation risk metrics that indicate medium impersonation risk, a quantity of impersonation metrics that indicate high impersonation risk, or the like). Next, the prediction system 225 may determine whether the quantity of impersonation risk metrics satisfies a scaled impersonation attack threshold.

In one example, the scaled impersonation attack threshold may be a percentage of impersonation risk metrics that indicate a low impersonation risk (e.g., 80%). Here, the prediction system 225 may identify a quantity of impersonation risk metrics that indicate a low impersonation risk. If the prediction system 225 determines that the quantity of impersonation risk metrics that indicate a low impersonation risk satisfies (e.g., is greater than or equal to) the threshold (e.g., such that at least 80% of impersonation risk metrics indicate a low impersonation risk), then the prediction system 225 may generate a scaled impersonation attack prediction indicating that a scaled impersonation attack is not likely to be occurring (e.g., that there is a low risk of an ongoing scaled impersonation attack).

In another example, the scaled impersonation attack threshold may be a percentage of impersonation risk metrics that indicate a medium impersonation risk (e.g., 60%). Here, the prediction system 225 may identify a quantity of impersonation risk metrics that indicate a medium impersonation risk. If the prediction system 225 determines that the quantity of impersonation risk metrics that indicate a medium impersonation risk satisfies (e.g., is greater than or equal to) the threshold (e.g., such that at least 60% of impersonation risk metrics indicate a medium impersonation risk), then the prediction system 225 may generate a scaled impersonation attack prediction indicating that a scaled impersonation attack could be occurring (e.g., that there is a medium risk of an ongoing scaled impersonation attack).

In another example, the scaled impersonation attack threshold may be a percentage of impersonation risk metrics that indicate a high impersonation risk (e.g., 40%). Here, the prediction system 225 may identify a quantity of impersonation risk metrics that indicate a high impersonation risk. If the prediction system 225 determines that the quantity of impersonation risk metrics that indicate a high impersonation risk satisfies (e.g., is greater than or equal to) the threshold (e.g., such that at least 40% of impersonation risk metrics indicate a high impersonation risk), then the prediction system 225 may generate a scaled impersonation attack prediction indicating that a scaled impersonation attack is likely to be occurring (e.g., that there is a high risk of an ongoing scaled impersonation attack).

Notably, the above examples are provided for illustrative purposes, and other implementations may be used. In some implementations, the prediction system 225 may be configured to generate the scaled impersonation attack prediction in another manner. For example, the prediction system 225 may be configured with a scaled impersonation attack prediction model that receives a plurality of impersonation risk metrics as input, and provides a scaled impersonation attack prediction as an output. In general, the prediction system 225 may generate the scaled impersonation attack prediction by applying a function to the plurality of impersonation risk metrics at a given time. In some implementations, the scaled impersonation attack prediction may be a binary indication value (e.g., yes or no), a probability (e.g., a value from 0.00 to 1.00), a scaled impersonation attack score (e.g., a value from 0 to 100), or another type of information indicative of a likelihood of an ongoing scaled impersonation attack.

In some implementations, the prediction system 225 may generate the scaled impersonation attack prediction based on a scaled impersonation risk pattern. For example, the prediction system 225 may be capable of identifying a pattern in individual impersonation risk metrics that is indicative of a scaled impersonation attack prediction. The pattern may be, for example, a cluster of interactions for which the associated sets of interaction information are missing the same items of passive user authentication information, a cluster of interactions that include one or more items of similar mismatched information, or the like. In some implementations, the prediction system 225 may identify the scaled impersonation risk pattern based on information associated with the plurality of impersonation risk metrics (e.g., by analyzing sets of interaction information associated with a group of interactions), and may generate the scaled impersonation attack prediction based on the identification of the scaled impersonation risk pattern.

As shown at reference 135, the prediction system 225 may selectively perform a security action based on the scaled impersonation attack prediction. The security action may include an action associated with stopping a scaled impersonation attack, mitigating a scaled impersonation attack, authenticating one or more interactions, or the like.

For example, if the scaled impersonation attack prediction indicates an ongoing scaled impersonation attack, then the security action may include a termination action associated with terminating one or more interactions in the plurality of interactions. That is, the prediction system 225 may perform one or more actions associated with terminating one or more ongoing interactions (e.g., one or more interactions for which a high impersonation risk was computed) if the scaled impersonation attack prediction indicates that a scaled impersonation attack is occurring. As another example, if the scaled impersonation attack prediction indicates an ongoing scaled impersonation attack, then the security action may include an authentication action associated with authenticating one or more interactions in the plurality of interactions. That is, the prediction system 225 may perform augmented or additional authentication for one or more interactions (e.g., one or more interactions for which a high or medium impersonation risk was computed) if the scaled impersonation attack prediction indicates that a scaled impersonation attack is or may be occurring. In some implementations, the prediction system 225 may utilize conversational AI in association with performing a security action. For example, the prediction system 225 may use conversational AI in association with terminating one or more interactions or authenticating one or more interactions (e.g., the prediction system 225 may use conversational AI to communicate with one or more interaction devices 210).

In some implementations, if the scaled impersonation attack prediction indicates an ongoing scaled impersonation attack, then the prediction system 225 may perform an attack pattern identification based on the plurality of sets of interaction information, the plurality of sets of passive user authentication information, or the plurality of impersonation risk metrics. That is, the prediction system 225 may analyze one or more items of information in an attempt to identify a pattern associated with the scaled impersonation attack (e.g., to glean information from a system-wide perspective, to identify a weak point associated with authentication of users). In some implementations, an attack pattern identified by the prediction system 225 may be used to improve system security (e.g., by strengthening a weak point associated with authentication of users).

In some implementations, if the scaled impersonation attack prediction indicates that a scaled impersonation attack is likely to be occurring, then the prediction system 225 may provide (e.g., to a system administrator) a message indicating that a scaled impersonation attack is likely to be occurring.

In some implementations, if the scaled impersonation attack prediction indicates that a scaled impersonation attack is not likely to be occurring, then the prediction system 225 may refrain from performing a security action. In some implementations, if the scaled impersonation attack prediction indicates that a scaled impersonation attack is not likely to be occurring, then the prediction system 225 may provide (e.g., to a system administrator) a message indicating that a scaled impersonation attack is not likely to be occurring.

In some implementations, the prediction system 225 may update a scaled impersonation attack prediction model based on feedback information. For example, the prediction system 225 may receive (e.g., from a system administrator, from the interaction backend system 220, or the like) feedback information associated with the scaled impersonation attack prediction. The feedback information may indicate whether the scaled impersonation attack prediction is correct or information indicating a degree to which the scaled impersonation attack prediction was correct or incorrect. Here, the prediction system 225 may receive the feedback information and may update the scaled impersonation attack prediction model (e.g., the model used to generate the scaled impersonation attack prediction) based on the feedback (e.g., so as to improve accuracy of a future scaled impersonation attack prediction).

As indicated above, FIGS. 1A-1D are provided as an example. Other examples may differ from what is described with regard to FIGS. 1A-1D.

Figure 2:
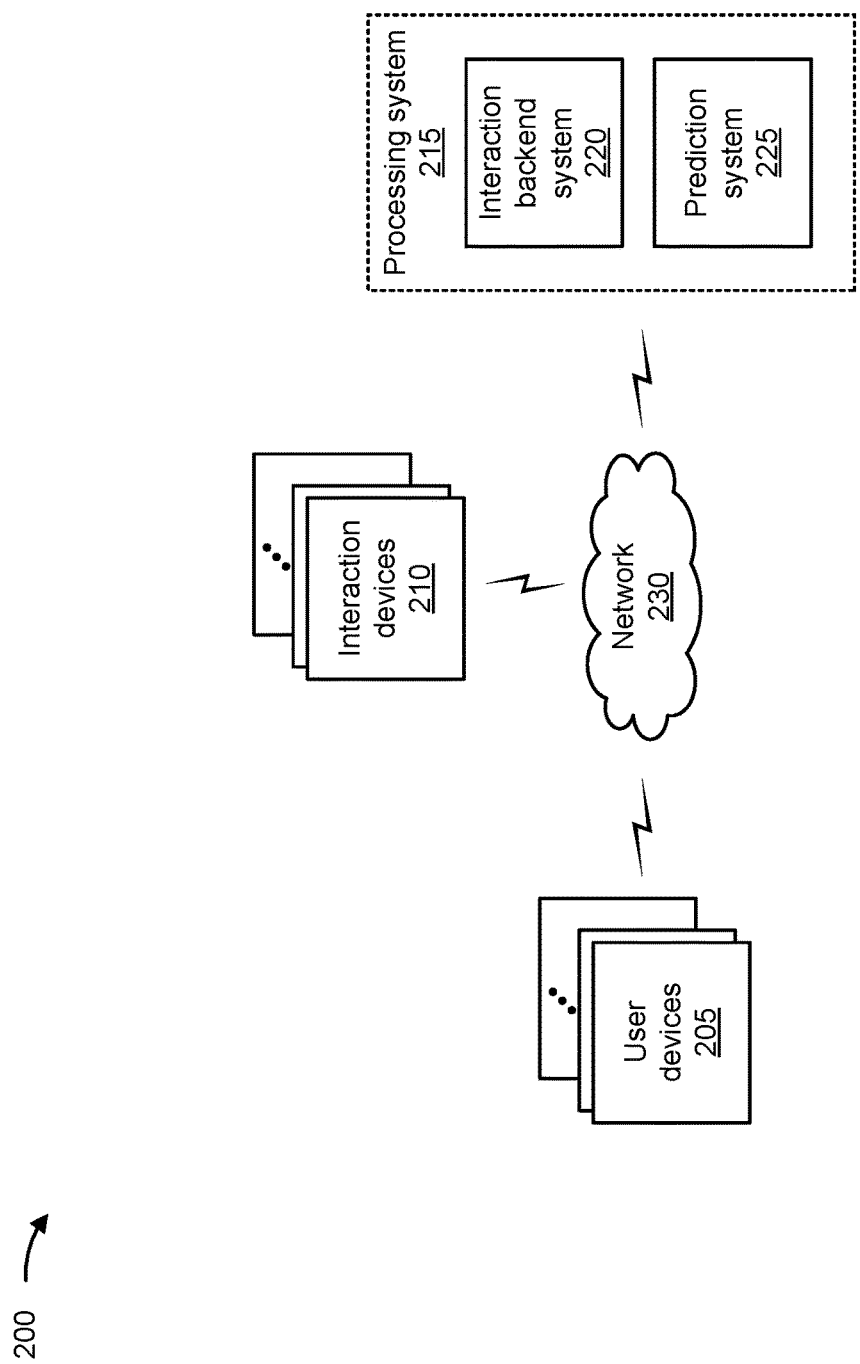
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include one or more user devices 205, one or more interaction devices 210, a processing system 215 comprising an interaction backend system 220 and a prediction system 225, and a network 230. Devices of environment 200 may interconnect via wired connections, wireless connections, or a combination of wired and wireless connections.

The user device 205 may include one or more devices capable of receiving, generating, storing, processing, providing, and/or routing passive user authentication information associated with generating a scaled impersonation attack prediction, as described elsewhere herein. The user device 205 may include a communication device and/or a computing device. For example, the user device 205 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. In some implementations, the user device 205 may include one or more components to facilitate obtaining passive user authentication information associated with a user, as described in more detail elsewhere herein.

An interaction device 210 includes one or more devices capable of receiving, generating, storing, processing, providing, and/or routing interaction information associated with generating a scaled impersonation attack prediction, as described elsewhere herein. The interaction device 210 may include a communication device and/or a computing device. For example, the interaction device 210 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. In some implementations, the interaction device 210 may include one or more components to facilitate obtaining interaction information associated with an interaction, as described in more detail elsewhere herein. In some implementations, a given interaction device 210 may correspond to a user device 205.

The processing system 215 includes one or more servers and/or computing hardware (e.g., in a cloud computing environment or separate from a cloud computing environment) configured to perform operations associated with generating a scaled impersonation attack prediction, as described in more detail elsewhere herein. As shown in FIG. 2, in some implementations, the processing system 215 includes the interaction backend system 220 and the prediction system 225. In some implementations, the interaction backend system 220 may perform operations associated with obtaining interaction information associated with an interaction as described in connection with FIG. 1B. In some implementations, the prediction system 225 may perform one or more operations associated with generating the scaled impersonation attack prediction, as described in connection with FIGS. 1A-1D. In some implementations, the processing system 215 may be implemented as a computing platform that executes code.

The interaction backend system 220 includes one or more devices capable of receiving, generating, storing, processing, providing, and/or routing passive user authentication information and/or interaction information associated with generating a scaled impersonation attack prediction, as described elsewhere herein. For example, the interaction backend system 220 may include one or more servers and/or computing hardware (e.g., in a cloud computing environment or separate from a cloud computing environment) configured to receive and/or store interaction information associated with interactions, as described herein. In some implementations, the interaction backend system 220 may process an interaction, such as to approve (e.g., permit, authorize, or the like) or decline (e.g., reject, deny, or the like) a transaction associated with the interaction and/or to complete the transaction if the transaction is approved. The interaction backend system 220 may process the interaction based on information received from an interaction device 210. In some implementations, the interaction backend system 220 may be associated with a financial institution (e.g., a bank, a lender, a credit card company, or a credit union) and/or may be associated with a transaction card association that authorizes a transaction associated with an interaction.

The prediction system 225 includes one or more devices capable of receiving, generating, storing, processing, providing, and/or routing information associated with generating a scaled impersonation attack prediction, as described elsewhere herein. The prediction system 225 may include a communication device and/or a computing device. For example, the prediction system 225 may include a server, such as an application server, a client server, a web server, a database server, a host server, a proxy server, a virtual server (e.g., executing on computing hardware), or a server in a cloud computing system. In some implementations, the prediction system 225 includes computing hardware used in a cloud computing environment.

The network 230 may include one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
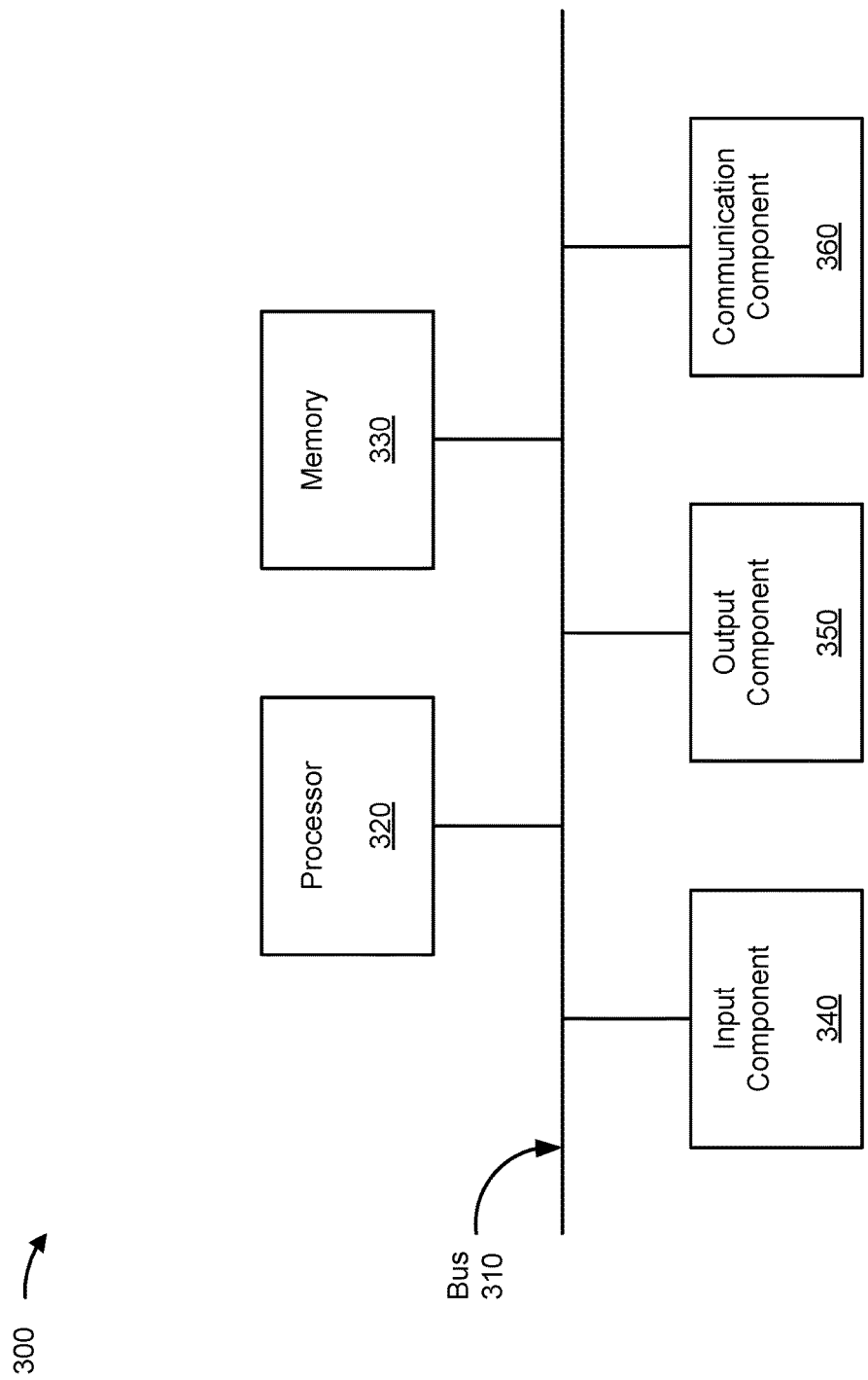
FIG. 3 is a diagram of example components of a device associated with visualization of data responsive to a data request, in accordance with some embodiments of the present disclosure.

FIG. 3 is a diagram of example components of a device 300 associated with visualization of data responsive to a data request. The device 300 may correspond to a user device 205, an interaction device 210, the processing system 215, the interaction backend system 220, and/or the prediction system 225. In some implementations, a user device 205, an interaction device 210, the processing system 215, the interaction backend system 220, and/or the prediction system 225 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with generating a scaled impersonation attack prediction. In some implementations, one or more process blocks of FIG. 4 may be performed by the prediction system 225. In some implementations, one or more process blocks of FIG. 4 may be performed by another device or a group of devices separate from or including the prediction system 225, such as the processing system 215 and/or the interaction backend system 220. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving a plurality of sets of interaction information, each set of interaction information in the plurality of sets of interaction information being associated with a respective interaction from a plurality of interactions, wherein each interaction in the plurality of interactions is associated with a respective user from a plurality of users (block 410). For example, the prediction system 225 (e.g., using processor 320, memory 330, input component 340, and/or communication component 360) may receive a plurality of sets of interaction information, each set of interaction information in the plurality of sets of interaction information being associated with a respective interaction from a plurality of interactions, as described above in connection with reference 115 of FIG. 1B. In some implementations, each interaction in the plurality of interactions is associated with a respective user from a plurality of users. As an example, the prediction system 225 may receive N sets of interaction information, with each set of interaction information being associated with a different ongoing interaction from a group of N ongoing interactions. Here, each of the N interactions is associated with a respective one of N users (e.g., N users for which the prediction system 225 stores sets of passive user authentication information).

As further shown in FIG. 4, process 400 may include retrieving a plurality of sets of passive user authentication information, each set of passive user authentication information in the plurality of sets of passive user authentication information being associated with a respective user from the plurality of users (block 420). For example, the prediction system 225 (e.g., using processor 320 and/or memory 330) may retrieve a plurality of sets of passive user authentication information, each set of passive user authentication information in the plurality of sets of passive user authentication information being associated with a respective user from the plurality of users, as described above in connection with reference 120 of FIG. 1B. As an example, the prediction system 225 may retrieve N sets of stored passive user authentication information, with each set of stored passive user authentication information being associated with a different user in the group of N users associated with the N interactions.

As further shown in FIG. 4, process 400 may include computing a plurality of impersonation risk metrics based on the plurality of sets of interaction information and the plurality of sets of passive user authentication information, each impersonation risk metric in the plurality of impersonation risk metrics being associated with a respective interaction from the plurality of interactions (block 430). For example, the prediction system 225 (e.g., using processor 320 and/or memory 330) may compute a plurality of impersonation risk metrics based on the plurality of sets of interaction information and the plurality of sets of passive user authentication information, each impersonation risk metric in the plurality of impersonation risk metrics being associated with a respective interaction from the plurality of interactions, as described above in connection with reference 125 of FIG. 1C. As an example, the prediction system 225 may compute N impersonation risk metrics, one impersonation risk metric for each of the N interactions associated with the N users.

As further shown in FIG. 4, process 400 may include generating a scaled impersonation attack prediction based on the plurality of impersonation risk metrics (block 440). For example, the prediction system 225 (e.g., using processor 320 and/or memory 330) may generate a scaled impersonation attack prediction based on the plurality of impersonation risk metrics, as described above in connection with reference 130 of FIG. 1D. As an example, the prediction system 225 may generate a scaled impersonation attack prediction based on the N impersonation risk metrics associated with the N interactions.

As further shown in FIG. 4, process 400 may include selectively performing a security action based on the scaled impersonation attack prediction (block 450). For example, the prediction system 225 (e.g., using processor 320 and/or memory 330) may selectively perform a security action based on the scaled impersonation attack prediction, as described above in connection with reference 135 of FIG. 1D. As an example, if the scaled impersonation attack prediction indicates an ongoing scaled impersonation attack, then the security action may include an action associated with terminating one or more of the N interactions or authenticating one or more of the N interactions.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for generating a scaled impersonation attack prediction, the system comprising:
   one or more memories; and
   one or more processors, coupled to the one or more memories, configured to:
      receive a plurality of sets of interaction information, each set of interaction information in the plurality of sets of interaction information being associated with a respective interaction from a plurality of interactions,
         wherein each interaction in the plurality of interactions is associated with a respective user from a plurality of users;
      retrieve a plurality of sets of passive user authentication information, each set of passive user authentication information in the plurality of sets of passive user authentication information being associated with a respective user from the plurality of users;
      compute a plurality of impersonation risk metrics for the plurality of interactions, wherein the plurality of impersonation risk metrics are computed based on a comparison of the plurality of sets of interaction information to the plurality of sets of passive user authentication information, the plurality of impersonation risk metrics comprising risk categories assigned to the interactions according to a number of matching items of information between compared sets evaluated against one or more predefined threshold values, and wherein the risk categories indicate a likelihood that the interactions are impersonation attempts;
      generate a scaled impersonation attack prediction based on the plurality of impersonation risk metrics; and
      selectively perform a security action based on the scaled impersonation attack prediction indicating a systemic impersonation attack involving multiple unauthorized interactions.

2. The system of claim 1, wherein a set of passive user authentication information in the plurality of sets of passive user authentication information includes at least one of:
   caller identification data associated with a user in the plurality of users,
   application-based authentication data associated with the user,
   near-field communication radio frequency identification (RFID) chip data associated with the user,
   passive ultrahigh frequency RFID data associated with the user, or
   ultra-wideband tag data associated with the user.

3. The system of claim 1, wherein a set of passive user authentication information in the plurality of sets of passive user authentication information includes location data associated with a user in the plurality of users, wherein the location data comprises at least one of:
   global navigation satellite system (GNSS)-based location data,
   interaction-based location data, or
   Internet-of-things (IoT)-based location data.

4. The system of claim 1, wherein a set of passive user authentication information in the plurality of sets of passive user authentication information includes interaction data associated with a user in the plurality of users.

5. The system of claim 1, wherein a set of passive user authentication information in the plurality of sets of passive user authentication information includes background noise data associated with a user in the plurality of users.

6. The system of claim 1, wherein the one or more processors, to compute an impersonation risk metric associated with an interaction associated with a user, are configured to:
   compare a set of interaction information associated with the interaction and a set of passive user authentication information associated with the user, and
   determine the impersonation risk metric based on a degree of matching between items of information the set of interaction information and corresponding items in the set of passive user authentication information.

7. The system of claim 1, wherein the one or more processors, to generate the scaled impersonation attack prediction, are configured to:
   identify a quantity of impersonation risk metrics, from the plurality of impersonation risk metrics, that satisfy an individual risk threshold of the one or more individual risk thresholds,
   determine whether the quantity of impersonation risk metrics that satisfy the individual risk threshold satisfies a scaled impersonation attack threshold, and
   generate the scaled impersonation attack prediction based on whether the quantity of impersonation risk metrics satisfies the scaled impersonation attack threshold.

8. The system of claim 1, wherein the one or more processors, to generate the scaled impersonation attack prediction, are configured to:
   identify a scaled impersonation risk pattern based on information associated with the plurality of impersonation risk metrics, and
   generate the scaled impersonation attack prediction based on the identification of the scaled impersonation risk pattern.

9. The system of claim 1, wherein the scaled impersonation attack prediction indicates an ongoing scaled impersonation attack, and selectively performing the security action comprises performing a termination action with respect to one or more interactions in the plurality of interactions.

10. The system of claim 1, wherein the scaled impersonation attack prediction indicates an ongoing scaled impersonation attack, and selectively performing the security action comprises performing an authentication action with respect to one or more interactions in the plurality of interactions.

11. The system of claim 1, wherein the scaled impersonation attack prediction indicates an ongoing scaled impersonation attack, and selectively performing the security action comprises intervening with respect to one or more interactions in the plurality of interactions using conversational artificial intelligence.

12. The system of claim 1, wherein the scaled impersonation attack prediction indicates an ongoing scaled impersonation attack, and selectively performing the security action comprises performing an attack pattern identification based on at least one of the plurality of sets of interaction information, the plurality of sets of passive user authentication information, or the plurality of impersonation risk metrics.

13. The system of claim 1, wherein the one or more processors are further configured to:
receive feedback information associated with the scaled impersonation attack prediction, and
update a prediction model associated with generating the scaled impersonation attack prediction based on the feedback information.

14. A method for generating a scaled attack prediction, comprising:
receiving, by a system, interaction information associated with a plurality of interactions,
wherein each interaction in the plurality of interactions is associated with a respective user from a plurality of users;
retrieving, by the system, passive user authentication information associated with the plurality of users;
computing, by the system, a plurality of risk metrics for the plurality of interactions, the risk metrics comprising risk categories assigned to the interactions by comparing, for the plurality of interactions, respective sets of interaction information to corresponding sets of passive user authentication information and evaluating a number of matching items of information between the compared sets against one or more individual risk thresholds, and wherein the risk categories indicate a likelihood that the interactions are impersonation attempts;
generating, by the system, a scaled attack prediction based on the plurality of risk metrics, the scaled attack prediction indicating an occurrence of a scaled attack; and
performing, by the system, a security action based on the scaled attack prediction indicating the occurrence of the scaled attack.

15. The method of claim 14, wherein the passive user authentication information includes at least one of:
caller identification data associated with one or more users in the plurality of users,
application-based authentication data associated with one or more users in the plurality of users,
near-field communication radio frequency identification (RFID) chip data associated with one or more users in the plurality of users,
passive ultrahigh frequency RFID data associated with one or more users in the plurality of users,
ultra-wideband tag data associated with one or more users in the plurality of users,
location data associated with one or more users in the plurality of users, or
interaction data associated with one or more users in the plurality of users.

16. The method of claim 14, wherein generating the scaled attack prediction comprises:

identifying a quantity of risk metrics, from the plurality of risk metrics, that satisfy an individual risk threshold of the one or more individual risk thresholds,
determining whether the quantity of risk metrics that satisfy the individual risk threshold satisfies a scaled attack threshold, and
generating the scaled attack prediction based on whether the quantity of risk metrics satisfies the scaled attack threshold.

17. The method of claim 14, wherein generating the scaled attack prediction comprises:
identifying a scaled risk pattern based on information associated with the plurality of risk metrics, and
generating the scaled attack prediction based on the identification of the scaled risk pattern.

18. The method of claim 14, wherein the security action comprises at least one of:
an action associated with terminating one or more interactions in the plurality of interactions,
an action associated with authenticating one or more interactions in the plurality of interactions, or
an action associated with identifying an attack associated with the scaled attack.

19. A non-transitory computer-readable medium storing a set of instructions, the set of instructions comprising:
one or more instructions that, when executed by one or more processors of a system, cause the system to:
receive a plurality of sets of interaction information and a plurality of sets of passive user authentication information, wherein each set of interaction information in the plurality of sets of interaction information is associated with a respective interaction from a plurality of interactions, and each set of passive user authentication information in the plurality of sets of passive user authentication information is associated with a respective user from a plurality of users;
compute a plurality of risk metrics based on the plurality of sets of interaction information and the plurality of sets of passive user authentication information wherein each risk metric in the plurality of risk metrics is associated with a respective interaction from the plurality of interactions and comprises a risk category assigned to the interaction based on whether a number of matching items of information between the respective set of interaction information and the corresponding set of passive user authentication information satisfies one or more individual risk thresholds;
generate a scaled attack prediction based on the plurality of risk metrics, the scaled attack prediction indicating a systemic security risk arising from coordinated impersonation attempts targeting a plurality of interactions or users within the system; and
perform an action based on the scaled attack prediction.

20. The non-transitory computer-readable medium of claim 19, wherein the one or more instructions, that cause the system to generate the scaled attack prediction, cause the system to:
identify a quantity of risk metrics, from the plurality of risk metrics, that satisfy an individual risk threshold of the one or more individual risk thresholds,
determine whether the quantity of risk metrics that satisfy the individual risk threshold satisfies a scaled attack threshold, and generate the scaled attack prediction based on whether the quantity of risk metrics satisfies the scaled attack threshold.

* * * * *